(12) United States Patent
Son et al.

(10) Patent No.: US 6,229,561 B1
(45) Date of Patent: May 8, 2001

(54) THREE-DIMENSIONAL IMAGE SYSTEM

(75) Inventors: Jung-Young Son, Seoul (KR); Victor Gregoryvich Komar, Moscow (RU)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 08/775,748

(22) Filed: Dec. 31, 1996

(30) Foreign Application Priority Data

May 3, 1996 (KR) .................................................. 96-14386

(51) Int. Cl.$^7$ ...................................................... A04N 13/00
(52) U.S. Cl. .................................. 348/42; 353/98; 353/8; 359/464
(58) Field of Search ............................ 348/42, 51; 345/7, 345/9; 353/7, 31

(56) References Cited

U.S. PATENT DOCUMENTS

| | | | |
|---|---|---|---|
| 4,995,718 | * 2/1991 | Jachimowicz et al. | 353/31 |
| 5,430,474 | * 7/1995 | Hines | 348/42 |
| 5,671,992 | * 9/1997 | Richards | 353/7 |
| 5,886,675 | * 3/1999 | Aye et al. | 345/7 |
| 5,917,562 | * 6/1999 | Woodgate et al. | 349/15 |
| 5,954,414 | * 9/1999 | Tsao | 353/7 |
| 5,991,073 | * 11/1999 | Woodgate et al. | 359/462 |

\* cited by examiner

*Primary Examiner*—Chris Kelley
*Assistant Examiner*—Shawn S. An

(74) *Attorney, Agent, or Firm*—Oblon, Spivak, McClelland, Maier & Neustadt, P.C.

(57) ABSTRACT

A multi-view three-dimensional image system that enables a plurality of observers to view a three-dimensional image simultaneously in the visible ray range without the utilization of special spectacles adapted for viewing three-dimensional images. The multi-view three-dimensional image system according to the present invention comprises an imaging apparatus wherein a plurality of vertical strip type electro-optic switches functioning as moving apertures are adjacently disposed in front of an object lens. The system also comprises a display apparatus which comprises an image projector having electro-optic switches and a projection lens similar to that in the imaging apparatus, a signal converter which converts a parallel signal to a serial signal, and a display having a holographic screen which displays a projected image. The imaging apparatus and the image projector acquire the image of objects and projects it through the vertical strip type electro-optic switches. The vertical strip type optical switches are opened or closed, for example, from right to left or from left to right 30 times per second. Since the vertical strip type electro-optic switches of the imaging apparatus function as moving apertures, the cross-sections viewed through adjacent vertical strip type electro-optic switch are slightly different. The image viewed through each vertical strip type electro-optic switch is recorded on the corresponding channel of the multi-channel video recorder. The signal converter of the image display apparatus makes the output of the multi-channel video recorder the same as the output of the camera utilized when acquiring the image. Since sub-view zones are defined by the vertical strip type electro-optic switches in the view-zone generated by the holographic screen, the three-dimensional image can be viewed at a number of points.

19 Claims, 7 Drawing Sheets

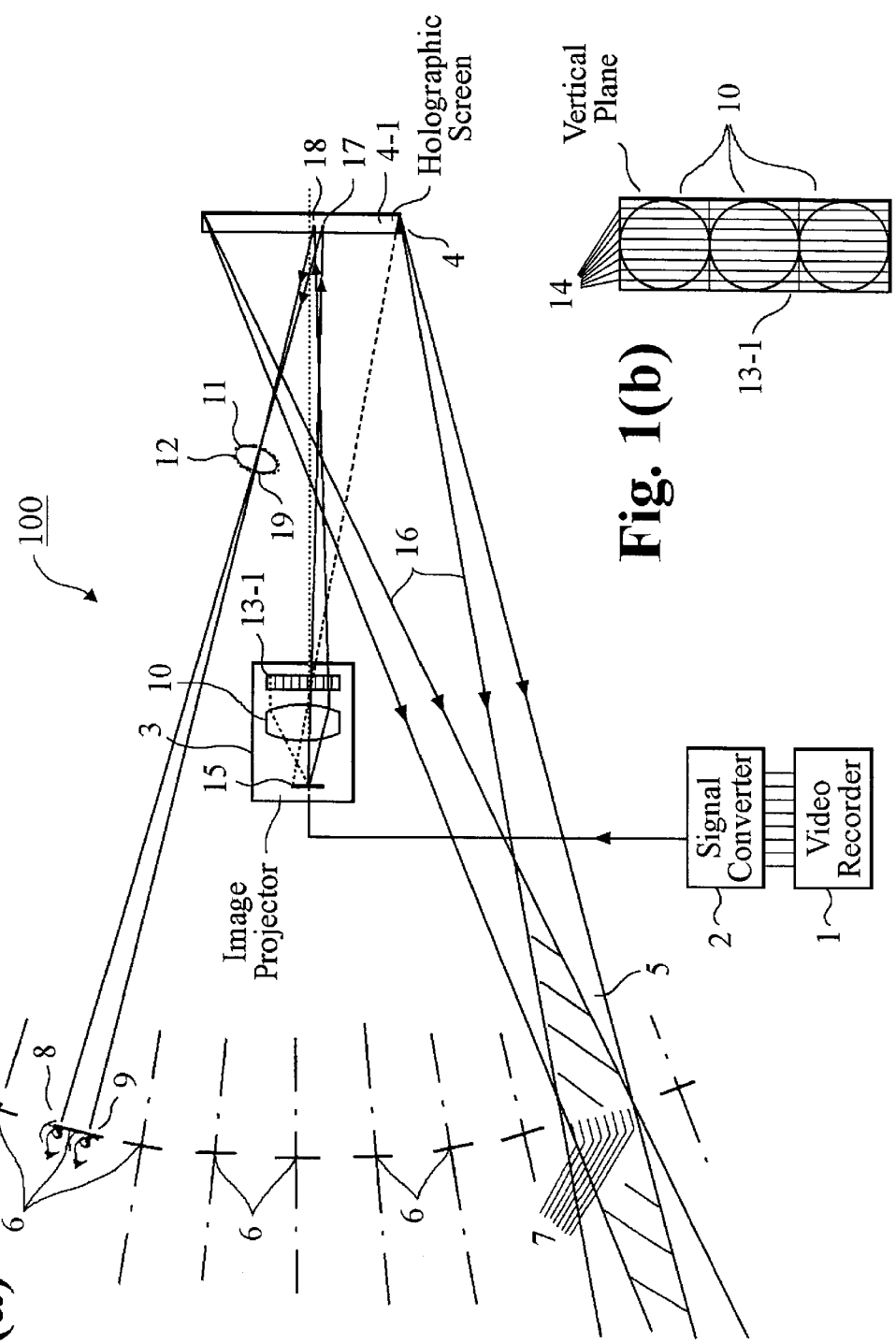

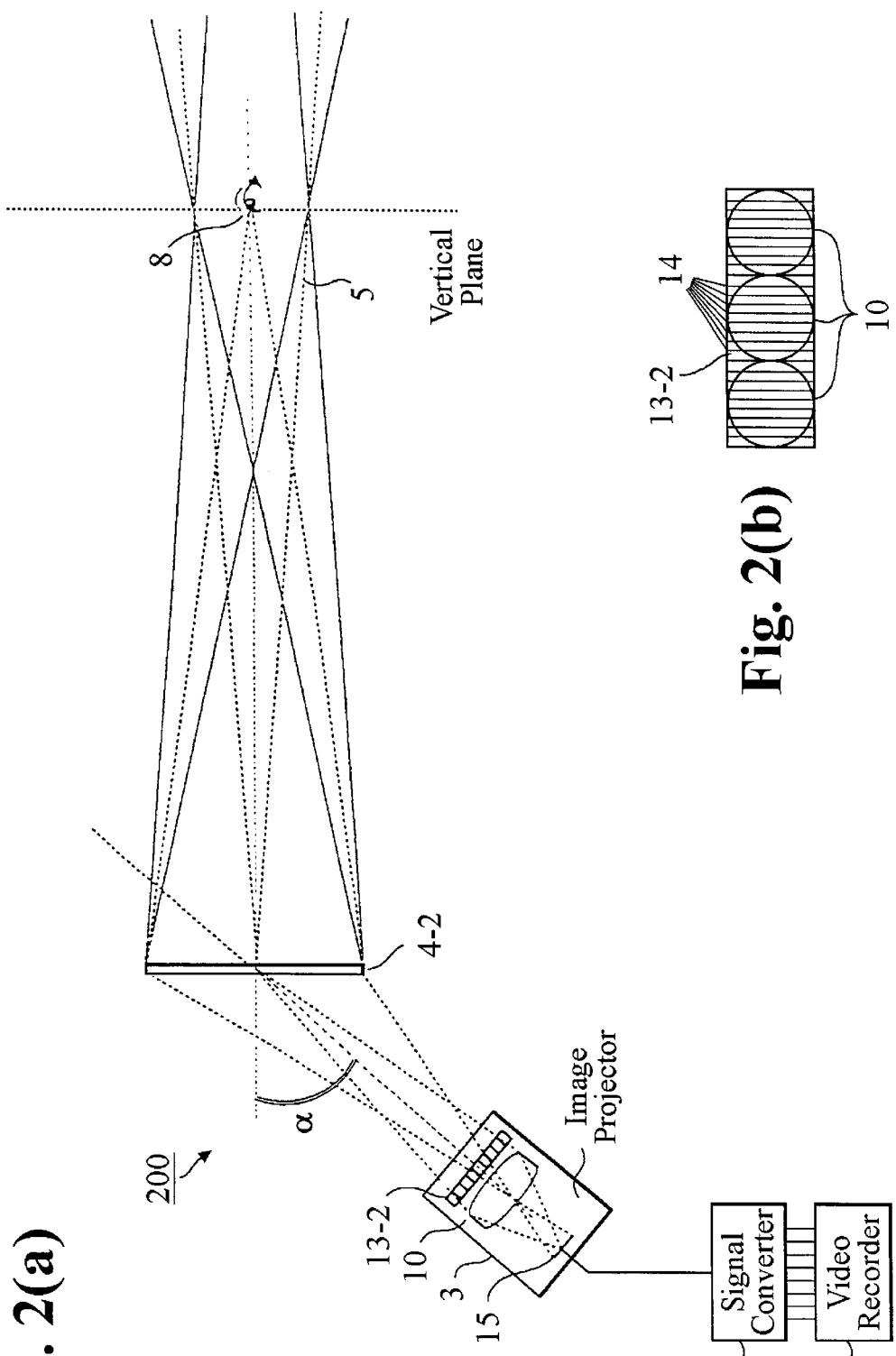
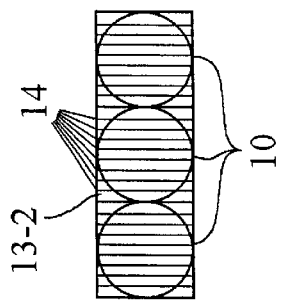

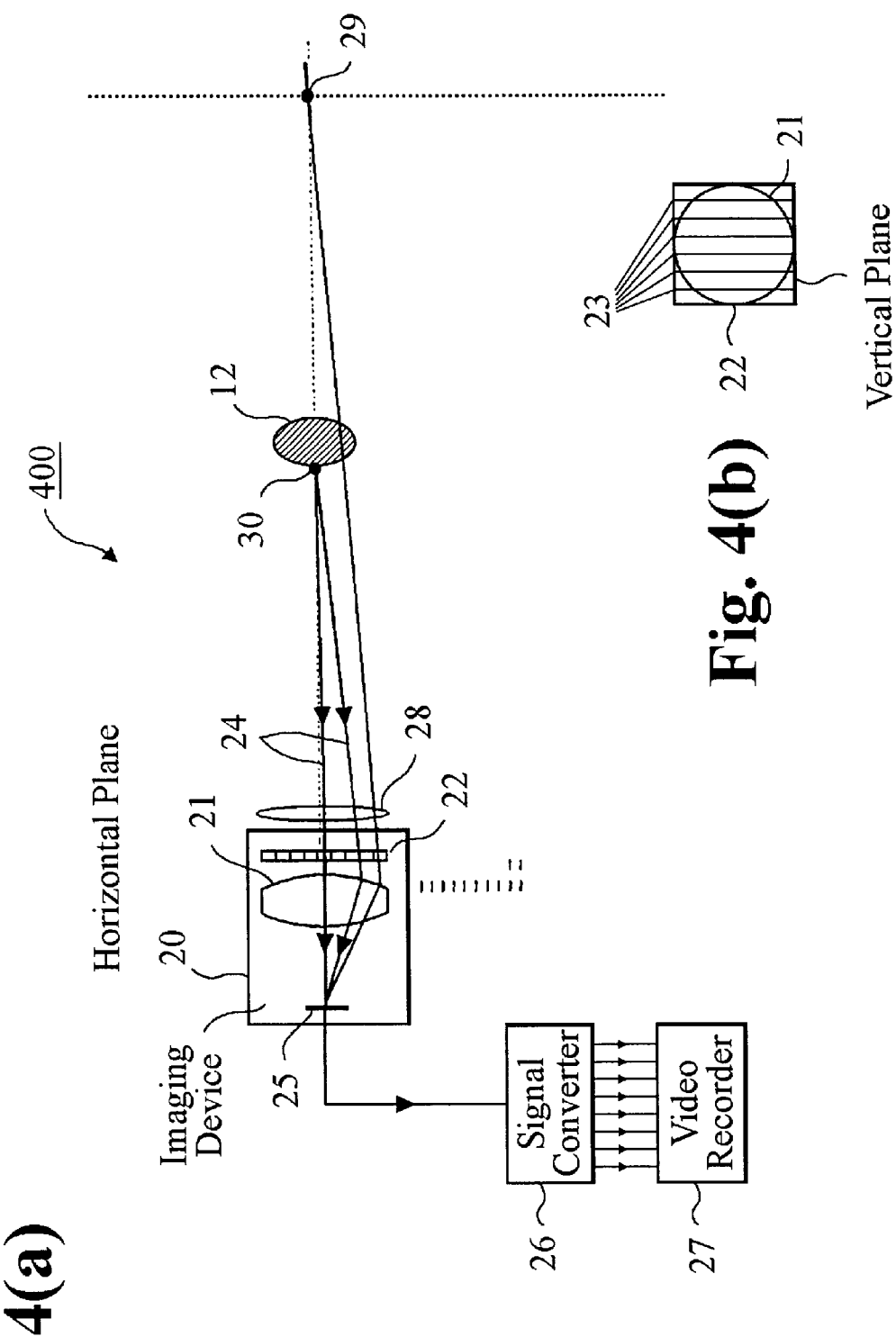
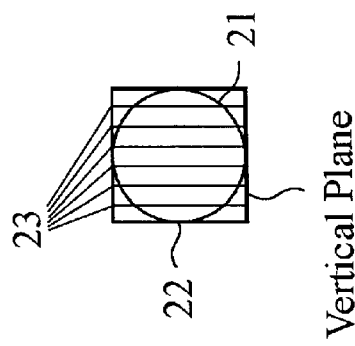
Fig. 4(a)
Fig. 4(b)

THREE-DIMENSIONAL IMAGE SYSTEM

BACKGROUND OF THE INVENTION

The present invention relates to an apparatus for acquiring and displaying three-dimensional images, and more particularly, to a non-spectacles type three-dimensional image system which utilizes a series of contiguously disposed electro-optic switches and a holographic screen.

A non-spectacles type three-dimensional image system is a kind of image systems which allows an observer to view three-dimensional images without the use of specially-designed spectacles. The conventional non-spectacles type three-dimensional image system utilizes the phenomena which manifest itself when an object is viewed with two eyes. In the conventional system, an even number of cameras disposed apart from one another a distance corresponding to the distance between our eyes (optic angle) are utilized to acquire sectional images of an object from different directions corresponding to the left and right eyes. The images acquired by the cameras are displayed on a display apparatus to be incident to the corresponding eyes.

However, the conventional system has drawbacks since a number of cameras must be utilized in order to acquire three-dimensional images. If only two cameras are used, then only the most basic three-dimensional image can be acquired which does not show changes of shape but only shows the sensation of depth notwithstanding the movement of the observer's eyes. Moreover, since the observer can view the image only in a restricted zone with the conventional non-spectacles type three-dimensional image system, the efficiency in utilizing the transmitted light is low. Particularly with a lenticular screen, the efficiency is low, since the observer can view a three-dimensional image only in an extremely restricted zone among the view zones defined by the screen.

SUMMARY OF THE INVENTION

An object of the present invention is to provide a three-dimensional image system capable of providing a high-quality three-dimensional image without utilizing a number of cameras to solve the aforementioned problems associated with the conventional system.

Another object of the present invention is to provide a three-dimensional image system capable of providing a high-quality three-dimensional image regardless of the viewing-position of the observer.

According to one aspect of the present invention, a three-dimensional image display apparatus is provided which comprises an image display device for displaying image signals from respective channels of a multi-channel image signal, a projection lens for focusing the image signals displayed on the three-dimensional image display device, switching means comprising a plurality of electro-optic switches each being opened or closed for transmitting or blocking the image signals which passed through the projection lens, and a holographic screen for converting the image signals which pass the switching means to three-dimensional image signals, the plurality of electro-optic switches being disposed adjacent to one another, and each of the switches being opened or closed in synchronization with the image signal in the corresponding channel of the multi-channel image signal to define a plurality of sub-view zones in a view zone so that a plurality of observers can view the three-dimensional image simultaneously.

According to another aspect of the present invention, a three-dimensional imaging apparatus is provided which comprises switching means comprising a plurality of electro-optic switches which are opened or closed to permit or block the transmission of light rays from an object, an object lens for focusing the light rays which pass the electro-optic switches, and a photodetector for sensing the light rays focused by said object lens to convert the sensed light rays to an image signal, the plurality of electro-optic switches being disposed adjacently on or near the principal plane of said object lens and sequentially opened or closed, so that images of the object from slightly different angles can be acquired.

According to still another aspect of the present invention, a three-dimensional image display apparatus is provided which comprises a multi-channel image signal providing means, a laser light source, a beam splitter for splitting a laser beam from the laser light source in correspondence with the number of channels in the multi-channel image signal, an image signal forming means for forming laser image signals by synchronizing each laser beam split by the beam splitter with the corresponding signal from the multi-channel image signal, a mixer for mixing the laser image signals from the image signal forming means, a scanning means for scanning the laser image signals mixed by the mixing means, and a holographic screen for converting the laser image signals scanned by the scanning means to a three-dimensional image signal, the three-dimensional image signal generated by the holographic screen defining a plurality of sub-view zones in a view zone, the number of said plurality of sub-view zones in each view zone corresponding to the number of channels of the multi-channel image signal so that a plurality of observers can view the three-dimensional image simultaneously.

According to still another aspect of the present invention, a three-dimensional image display apparatus is provided which comprises a multi-channel image signal providing means, a laser light source, a beam splitter for splitting a laser beam from the laser light source in correspondence with the number of channels in the multi-channel image signal, an image signal forming means for forming laser image signals by synchronizing each laser beam split by the beam splitter with the corresponding signal from the multi-channel image signal, a mixer for mixing the laser image signals from the image signal forming means, a scanning means for scanning the laser image signals mixed by the mixing means, and a lenticular screen for converting the laser image signals scanned by the scanning means to a three-dimensional image signal, the three-dimensional image signal generated by the lenticular screen defining a plurality of sub-view zones in each view zone, the number of the plurality of sub-view zones corresponding to the number of channels of the multi-channel image signal so that a plurality of observers can view the three-dimensional image simultaneously.

The term "electro-optic switch" is used herein to refer to a means capable of permitting or blocking the transmission of light by the application of an electric field. Liquid crystal or crystal can be utilized for the electro-optic switch, and any other means capable of permitting or blocking the transmission of light by the application of an electric field can also be utilized as the "electro-optic switch". The electro-optic switch includes a plurality of vertical strips. The total signal bandwidth required in the three-dimensional image system of the present invention is 5.3 MHz (which is the bandwidth for one channel in a state of the art TV system) multiplied by the number of vertical strips in the electro-optic switch.

The holographic screen is a holographic optical device such as a reflection-type holographic screen (e.g., a spheretype reflection mirror which functions as a spherical mirror and reflects a projected image to a number of designated directions), or a transmission-type holographic screen which functions as a lens allowing a projected image to be transmitted to a number of designated directions, and is capable of defining a number of view zones.

BRIEF DESCRIPTION OF THE DRAWINGS

The foregoing and other objects, features and advantages of the present invention will be apparent from the following description of the preferred embodiments of the present invention taken in conjunction with the accompanying drawings, wherein like reference numerals are used to refer to like or similar parts, and in which:

FIG. 1(a) a display apparatus of a non-spectacles type multi-view three-dimensional image system utilizing a reflection-type holographic screen according to the present invention.

FIG. 1(b) shows an electro-optic switch utilized in the display apparatus of the three-dimensional image system shown in FIG. 1(a).

FIG. 2(a) shows a display apparatus of a non-spectacles type multi-view three-dimensional image system utilizing a transmission-type holographic screen according to the present invention.

FIG. 2(b) shows an electro-optic switch utilized in the display apparatus of the three-dimensional image system shown in FIG. 2(a).

FIG. 4(a) shows the imaging apparatus of the three-dimensional image system according to the present invention.

FIG. 4(b) shows an electro-optic switch utilized in the imaging apparatus shown in FIG. 4(a).

DETAILED DESCRIPTION OF PREFERRED EMBODIMENTS

Figure 3:
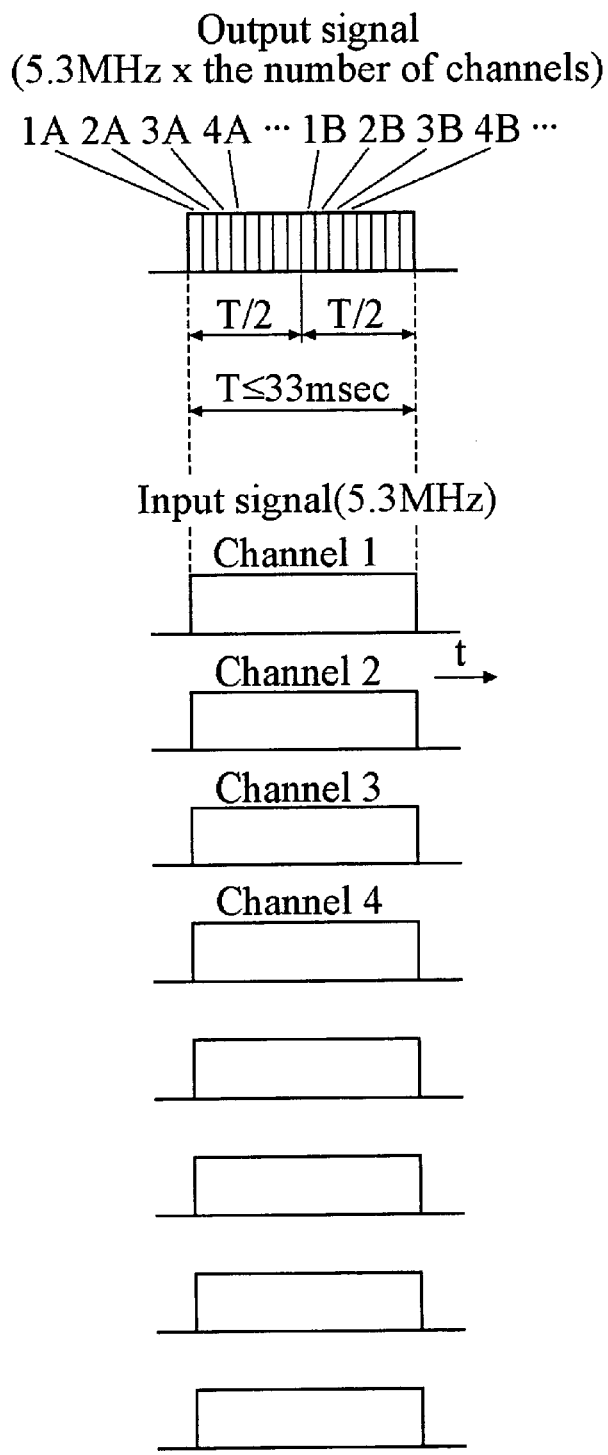
FIG. 3 shows the relationship between the input and output signals of a signal converter for use in the display apparatus of the three-dimensional image system according to the present invention.

FIG. 1(a) shows a display apparatus of a non-spectacles type multi-view three-dimensional image system utilizing a reflection-type holographic screen according to the present invention, and FIG. 1(b) shows the electro-optic switch utilized in the display device shown in FIG. 1(a). FIG. 2(a) and FIG. 2(b) shows a similar display apparatus and electro-optic switch as shown in FIG. 1(a) and FIG. 1(b), respectively, in which a transmission-type holographic screen is utilized instead of the reflection-type holographic screen. As shown in FIGS. 1(a) and 1(b), the three-dimensional image display apparatus 100 of the present invention generally includes a video recorder 1, a signal converter 2, an image projector 3 and a holographic screen 4-1. The image projector 3 comprises an image signal display 15 such as a liquid crystal panel or a CRT, a projection lens 10 and electro-optic switches 13-1, 13-2.

The multi-channel image signals from the video recorder 1 are converted to single channel (continuous) image signals by the signal converter 2. The format of the converted image signals will be described later on with reference to FIG. 3. The converted image signals are displayed on the image signal display 15. The displayed images pass through the projection lens 10, and are projected onto the holographic screen 4-1 separately for each channel according to the opening and closing operations of the electro-optic switch 13-1. The electro-optic switch 13-1 is located on or near the rear principal plane of the projection lens 10. The electro-optic switch 13-1 comprises a plurality of vertical strip type electro-optic switches 14 which are adjacent to one another, insulated from one another, and can be independently opened ("on") or closed ("off"), for example, from right to left or from left to right. Liquid crystal may be utilized for these vertical strip type electro-optic switches. The number of the vertical strip type electro-optic switches is equal to the number of the channels recorded in the video recorder. The width of each of the strips is narrower at the center than at the circumferences, so that they occupy the equal pupil area of the projection lens 10. Each vertical strip type switch 14 is opened ("on") only when the image of the corresponding channel is displayed on the CRT screen 15, and otherwise closed ("off"). The opening and closing operations of the vertical strip type electro-optic switches 14 should be synchronized with respect to each image signal for respective channel. The synchronization can be achieved electrically in the same manner as in a VTR (video tape recorder). According to a preferred embodiment of the present invention, the first image signal for a respective channel and the electro-optic switch corresponding thereto, are synchronized electrically and the subsequent image signals for the remaining channels are transmitted sequentially according to the period of the opening and closing operation of the subsequent electro-optic switch for every predetermined period.

The light rays 16 reflected by the holographic screen 4-1 converge to a number of specific directions to define view zones 5 in which the observer's eyes are located. The number of view-zones 5 defined by the holographic screen 4-1 is determined according to the number of exposures or the number of object beams when the holographic screen 4-1 is manufactured. The distance between the view-zones 5 is defined as a distance between the centers 6 of view-zones 5. The locations of the centers 6 of the view zones are determined by the manufacturing scheme of the holographic screen 4-1. The size of the view zones 5 is larger than and proportionate to the size of the aperture of the projection lens 10, and it can be calculated by multiplying the area of the aperture of the projection lens 10 with the ratio of the distances: from the view zone center to the holographic screen 4-1 and from the lens 10 to the holographic screen 4-1. Each view zone 5 comprises sub-view zones 7 which are defined according to the width of the vertical-strip type electro-optic switch coupled to the projection lens 10. A pixel at one point 17 on the holographic screen 4-1 is incident to the observer's left eye 8, and a pixel at another point 18 is incident to the observer's right eye 9, thus enabling the observer to view a three-dimensional image. The light which reaches the sub-view zone 7 is scanned, for example, from left to right or from right to left by the sequential opening or closing operation of the vertical strip type electro-optic switch. Each vertical strip is opened and closed 60 times per second. Therefore, the alternation period of the image is 1/(60×the number of vertical strips in the electro-optic switch), and no flickering of the image can be sensed.

Since each vertical strip of the electro-optic switch 13-1 defines a sub-view zone 7 in view zone 5 in correspondence with the aperture plane of the projection lens 10, the image projected through each vertical strip can be viewed only within the corresponding sub-view zone 7. Therefore, if each of the observer's eye is located in different sub-view zones 7, a three-dimensional image can be viewed. The width of the sub-view zones 7 should be not more than the distance between our eyes, and not less than the pupil size of a human eye in order to acquire smooth three-dimensional images. Although the number of vertical strips is determined according to the area of the aperture of the object lens, the sensitivity of the photodetector, etc., more vertical strips can result in a smoother image.

The projection lens 10 installed in the image projector 3 should be large enough to restore the three-dimensional image 11 of an object. Since the signal bandwidth of each channel recorded on the video recorder is equal to that of a conventional TV, the CRT device should have a high enough response speed to operate within a signal bandwidth equal to the signal bandwidth of each channel multiplied by the number of the channels.

Since the holographic screen has wavelength-selective characteristics, a narrower wavelength of the CRT or liquid crystal panel 15 results in a higher efficiency in utilizing light and in lower noise. In order to display a true color image, three CRT's or liquid crystal panels corresponding to red, green and blue are required. The spectral characteristics of the CRT or the liquid crystal panel should be such that the bandwidth thereof is equal to the narrow range of reflection given by the selective spectral characteristics of the holographic screen 4-1.

The display apparatus shown in FIG. 2(a) utilizes a transmission-type holographic screen 4-2 instead of the reflection-type holographic screen utilized in the display device shown in FIG. 1(a). In the display apparatus 200 shown in FIG. 2(a), the image signal which passes the electro-optic switch 13-2 is transmitted through the transmission-type holographic screen 4-2. Thereafter, the light is directed to a number of predetermined directions to define view zones 5, and a three-dimensional image is displayed similarly as in the display device shown in FIG. 1(a).

The spectral characteristics of the CRT or the liquid crystal panel 15 in the image projector should be such that the bandwidth thereof is equal to the narrow range of transmission given by the selective spectral characteristics of the holographic screen 4-2. Also, with the transmission-type holographic screen 4-2, narrower spectral characteristics of the CRT or liquid crystal panel 15 results in a better uniformity of colors.

When using the transmission-type holographic screen 4-2, it is important to prevent the formation of a ghost image. Ghost images appear when light, with a wavelength different from that of the light corresponding to the diffraction lattice corresponding to each of the three primary colors of the light recorded on the holographic screen 4-2, is diffracted. Thus, in order to prevent the formation of ghost images, the acute angle (a) defined at the intersection of two lines, the first of the two lines extending from the center of the projection lens 10 to and beyond the center of the transmission-type holographic screen 4-2 and the second of the two lines extending from the center 8 of the view-zone 5 to and beyond the center of the transmission-type holographic screen 4-2, should be adjusted to be within the range of 30 to 45 degrees. As shown in FIG. 2(b), three projection lenses 10 are disposed in a horizontal direction. In correspondence with the arrangement of the three projection lenses 10, three electro-optic switches 13-2 are disposed in the horizontal direction as shown in FIG. 2(b). However, according to the teachings of the present invention, the electro-optic switch may be disposed in either a horizontal or vertical direction, provided that it is compatible with the specific characteristics of the display device.

FIG. 3 shows the relationship between the input and output signals of the signal converter for use in the display apparatus according to the present invention. The signal of each channel, which has a signal bandwidth equal to that of the TV of the current technology is input to the signal converter 2 (FIG. 1(a) or 2(a)) in parallel. The input signal of each channel is sequentially sampled with a sampling period of 33/2N msec (where N is the total number of channels) in the signal converter 2 (FIG. 1(a) or 2(a)) to make the shape of the signal appropriate for interlaced scanning. This sampling is performed twice with respect to one frame of each channel. As a result, the signal of each channel is twice sampled sequentially for each frame and rearranged into a train of signals to generate the output signal of the signal converter. The opening of each vertical strip of the electro-optic switch 13-1 (FIG. 1(b) or 2(b)) which is coupled to the projection lens 10 (FIG. 1(a) or 2(a)) is synchronized with the train of signals, and the strip is opened for 33/2N msec only when the signal of the corresponding channel is incident thereto. Since the signal converter 2 (FIG. 1(a) or 2(a)) is a high frequency synthesizer, and the input frequency of the converter is 5.3 MHz, whereas the output frequency of the converter is 5.3 MHz×N (a synthesis of the frequencies of all channels).

FIG. 4(a) shows an imaging apparatus according to the present invention, and FIG. 4(b) shows the electro-optic switch 22 utilized in the imaging apparatus 400 shown in FIG. 4(a). An imaging device 20 generally includes a large aperture lens (object lens) 21 similar to and having the same characteristics as the projection lens 10 (FIG. 1(a) or 2(a)) utilized in the display apparatus 400 according to the present invention, an electro-optic switch 22 comprising a plurality of vertical strips 23 which are coupled to the lens 21, and a photodetector 25. The electro-optic switch 22 has the same physical and optical characteristics as the electro-optic switch 13-1 or 13-2 in the display apparatus 100 or 200 shown in FIG. 1 or FIG. 2. The vertical strips 23 of the electro-optic switch 22 are insulated from one another, and are independently switched open or closed sequentially, for example, from right to left or from left to right. The width of each of the vertical strips 23 of the electro-optic switches can be made such that the width at the center of an aperture of the object lens 21 is narrower than that at the circumference of the aperture of the object lens 21, thus making the partial area of the aperture covered by each vertical strip 23 equal. Since the image viewed through each vertical strip 23 shows slightly different sectional-views, the image varies depending on the view-points. The light ray 24 reflected from the point 30 of object 12 passes through the electro-optic switch 22 and forms an image on the photodetector 25. However, since only one vertical strip 23 is opened at each moment in the electro-optic switch 22, each cross-section of the object is recorded on the photodetector 25 in the direction corresponding to each vertical strip type electro-optic switch 22. The image signal recorded on the photodetector 25 is recorded on the corresponding channel of a multi-channel video recorder 27, which has the same number of channels as vertical strips, through a signal converter 26 before the next vertical strip 23 is opened.

Each vertical strip 23 is sequentially opened and closed 30 times per second, and for a period of 33/N msec for each opening (N is the number of channels) so that each channel has a frequency bandwidth corresponding to one TV channel of the current technology. In order to increase the distance between the large aperture lens 21 and the convergence plane 29 which is determined by the photodetector 25, a lens 28 with a large focal distance is disposed in front of the imaging device 20. The plane 29 is in optical conjugation with the holographic screen. With this structure, it is possible to modify the distance between the holographic screen and the image point 19 corresponding to the point 30 of the object.

Figure 5:
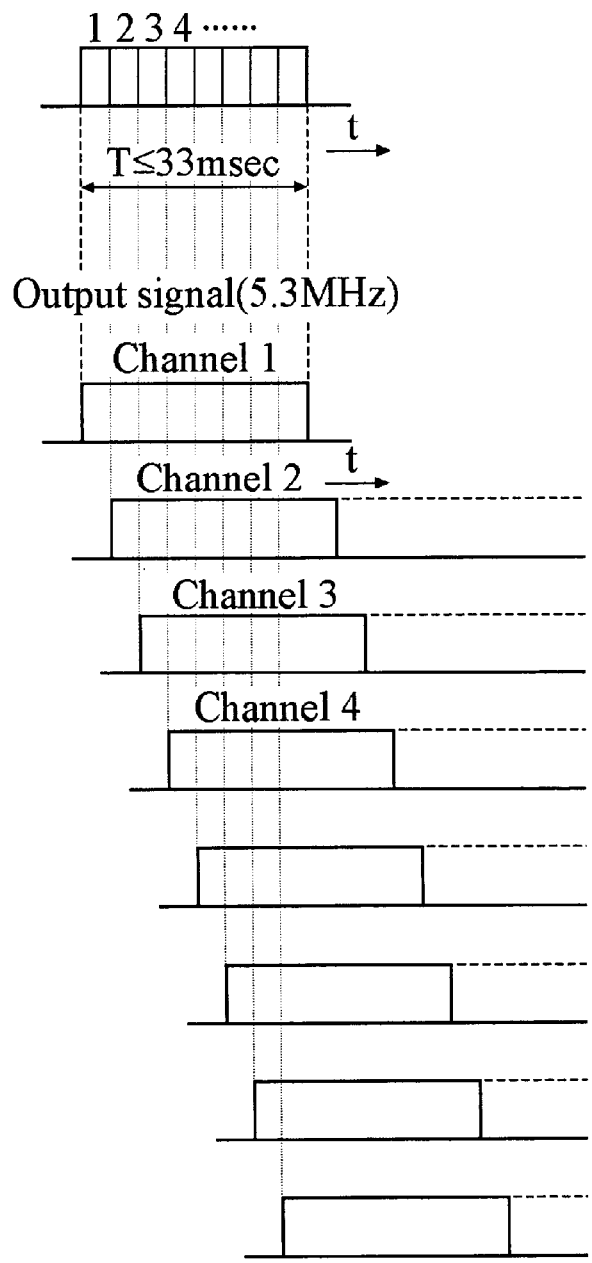
FIG. 5 shows the relationship between the input and output signals of the signal converter for use in the imaging apparatus of the three-dimensional image system according to the present invention.

FIG. 5 shows the relationship between the input and output signals of the signal converter 26 of the imaging device 20 (FIG. 4(a)). The signal converter 26 (FIG. 4(a)) records the output image signals of the imaging device 20 composed of a train of signals formed by the sequential opening and closing operations of each vertical strip, on the corresponding channels for vertical strips. Each vertical strip and the channel corresponding thereto are mutually synchronized. Such synchronization may be performed in the same manner as that utilized generally in a VTR, and will be apparent to those skilled in the art. The image signal bandwidth of each channel coincides with a TV signal bandwidth of the current technology. The signal converter 26 (FIG. 4(a)) converts a high frequency input signal (5.3 MHz×N) to N-channel, 5.3 MHz signals.

Figure 6:
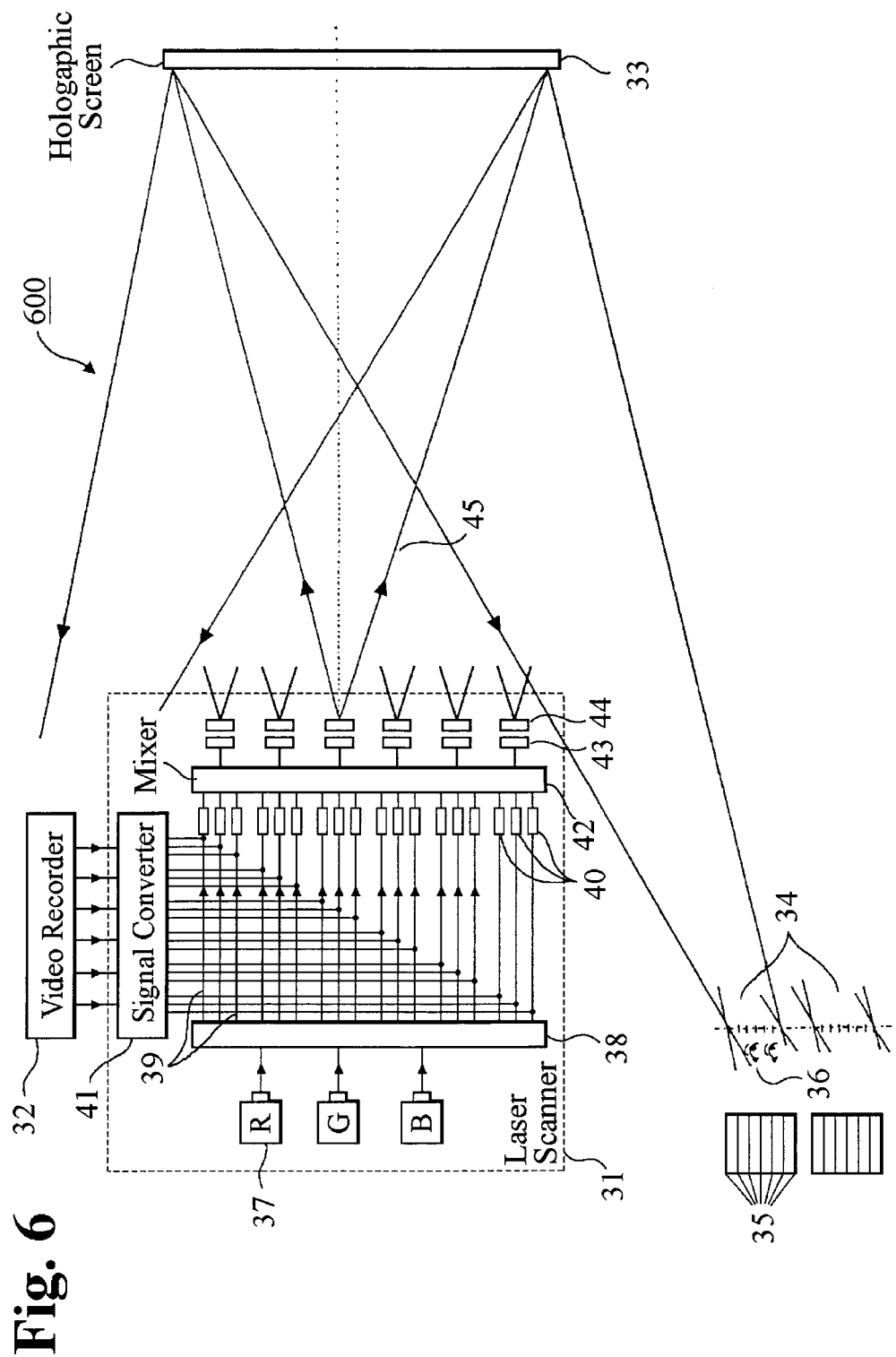
FIG. 6 the display apparatus of the multi-view three-dimensional image system utilizing a laser scanning apparatus and a holographic screen according to the present invention.

FIG. 6 shows still another embodiment of a three-dimensional image signal display apparatus according to the present invention. The display apparatus 600 shown in FIG. 6 is a multi-view three-dimensional image display apparatus which utilizes a laser scanner and a holographic screen for diffusing light.

Referring to FIG. 6, the laser scanner 31 generally includes a multi-channel video recorder 32, a signal converter 41, light sources 37 comprising red, green and blue (RGB) lasers 37, a beam splitter 38 for splitting each laser beam from the light sources, three optical modulators 40 for respective channels which modulate red, green and blue laser beams, a mixer 42 for putting together the laser beams from the optical modulators 40 for respective channels, and horizontal scanners 43 and vertical scanners 44 of the same number as the number of channels of the multi-channel video recorder 32. The multi-channel TV image signal incident simultaneously from the video recorder 32 is split into the signals corresponding to RGB colors for respective channels by the signal converter 41. These split signals are input to the respective optical modulators 40. The laser beams from the light sources 37 are also split into beams 39 for each color by the beam splitter 38 to be input to the optical modulators 40, the number of the beams being equal to the number of channels. The optical modulators 40 modulate the intensity of the laser beams 39 according to the input split signals. The modulated laser beams from the three optical modulators 40 corresponding to different colors for each channel are put together in the beam mixer 42 to form a single beam for each channel. The beam from the mixer 42 is scanned on the holographic screen 33 by way of the horizontal and vertical scanners 43 and 44. The holographic screen 33 scatters the laser beam 45 scanned by the scanners 43 and 44 in all directions to define sub-view zones 35 in accordance with the number of channels in a view zone 34. Only the laser beam scanned by the scanner which corresponds to each channel is incident to each sub-view zone. In this case, if the observer's left and right eyes are disposed in different sub-view zones, respectively, it is possible to view a three-dimensional image.

Figure 7:
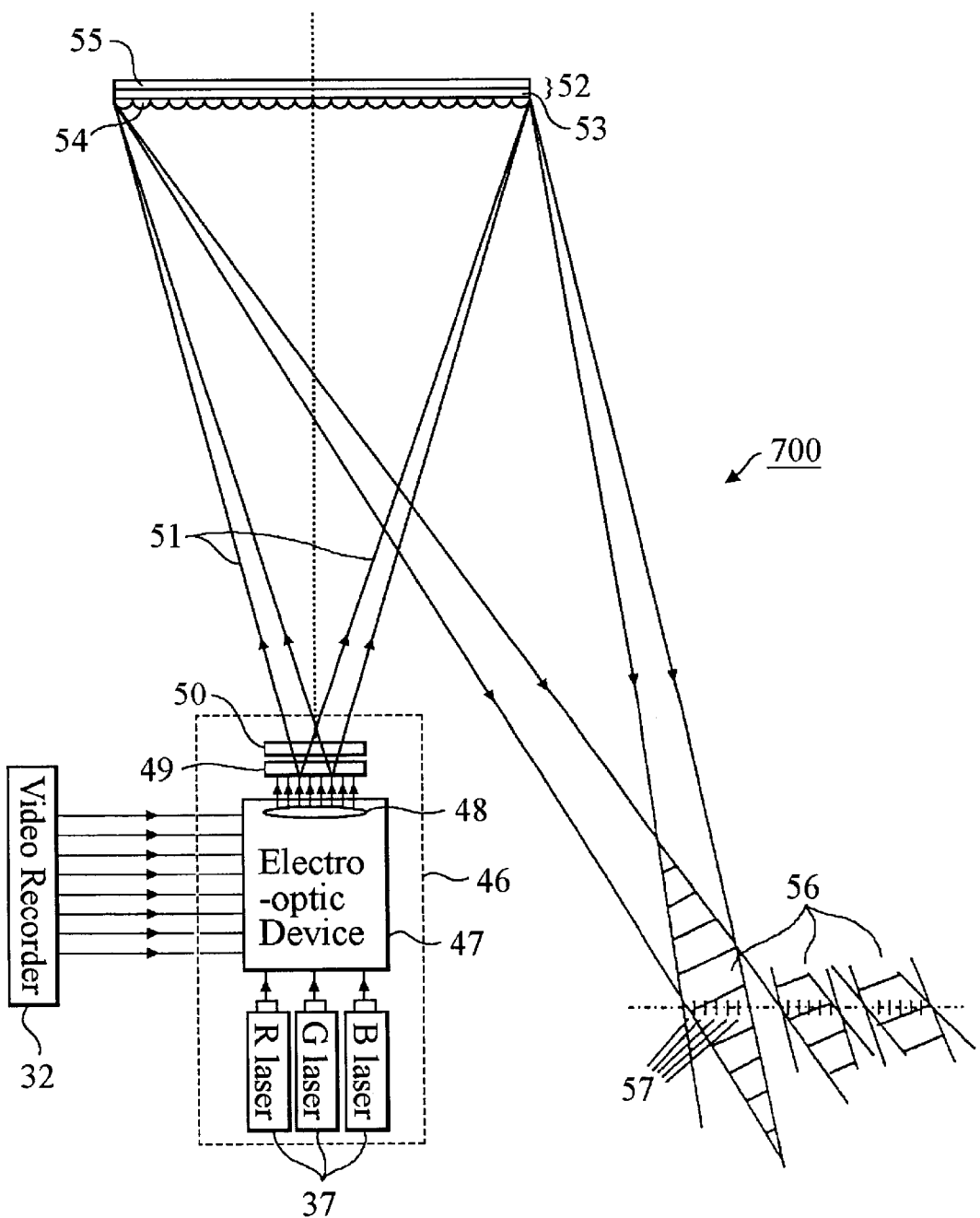
FIG. 7 the display apparatus of the multi-view three-dimensional image system utilizing a laser scanning apparatus and a lenticular screen according to the present invention.

FIG. 7 shows still another embodiment of a three-dimensional image display apparatus according to the present invention. The apparatus 700 shown in FIG. 7 utilizes a lenticular screen 52 and a laser beam scanning device 46 which is similar to the laser scanner 31 shown in FIG. 6 but utilizes a collimator 48.

In this apparatus 700, the image signal of each channel, which is incident in parallel through the multi-channel video recorder 32, is split in correspondence with each color by the electro-optic device 47 in the laser beam scanning device 46. Red, green and blue lasers 37 are used as light sources, and the beam from each light source is split into a number of beams equal to the number of channels. Each image signal functions to modulate the beams from the light sources in an optical modulator (not shown) of the electro-optic device 47 to form an output. The electro-optic device 47 not only functions to split the image signal and modulate the beams from the light sources, but also puts together the outputs from the three electro-optic modulators corresponding to respective channels. The optical outputs which have been put together are converted to a collimated beam by the collimator 48. The collimated beam corresponding to each channel is incident to a acousto-optic type horizontal scanner 49, and its output is incident on a lenticular screen 52 through a vertical beam scanner 50.

The lenticular screen 52 comprises a first layer 53 comprising a plurality of lenses 54 adjacent to one another for modulating an incident signal, and behind the first layer 53, a second layer 54 which functions as a scattering plate which scatters the laser beam to the front direction thereof. Thus, the beam 51 incident on the lenticular screen 52 is scattered by the scattering plate 54, and is focused at a view zone 56 defined according to the characteristics of the lenticular screen 52. Since the horizontal beam scanner for each channel is disposed at a different location, the scanned image corresponding to each channel appears only in the corresponding sub-view zone 57 of the view zone 56 defined by the lenticular screen 52. Therefore, it is possible to view a three-dimensional image.

As illustrated in the foregoing, the three-dimensional image system according to present invention solves the problems of the conventional non-spectacles stereoscopic type three-dimensional image system. It also provides a high quality three-dimensional image without the utilization of a number of cameras. It also has an advantage that a high quality three-dimensional image is provided regardless of the viewing position of the observer.

Although the present invention is described with respect to the particular embodiments, it will be apparent to those skilled in the art that various applications and modifications can be readily made without departing from the scope of the above-described principles and features of the present invention. Therefore, the present invention should not be interpreted to be limited to the above described embodiments.

What is claimed is:

1. A three-dimensional image display apparatus, comprising:
   a display device configured to display an image corresponding to a signal from a selected channel of a multi-channel image signal;
   a projection lens configured to project said image displayed on said display device;

a switching mechanism comprising a plurality of electro-optic switches each being opened or closed and configured to transmit or block the projected image which passed through said projection lens; and a holographic screen configured to reflect the transmitted projected image to be viewed as a three-dimensional image;

said plurality of electro-optic switches being disposed adjacent to one another, and each of said switches being opened or closed in synchronization with the image signal in a corresponding channel of the multi-channel image signal.

2. The three-dimensional image display apparatus according to claim 1, further comprising:

an image recording medium configured to record the multi-channel image signal; and a signal converter configured to convert said multi-channel image signal recorded on said image recording medium to single-channel continuous image signals to be supplied to said display device, said image display device displaying said single-channel continuous image signals converted by said signal converter.

3. The three-dimensional image display apparatus according to claim 2, wherein the number of channels of the multi-channel image signal recorded on said image recording medium is equal to the number of electro-optic switches.

4. The three-dimensional image display apparatus according to claim 2, wherein said image recording medium is a video recorder.

5. The three-dimensional image display apparatus according to claim 2, wherein said signal converter synchronizes lower frequency image signals of the multi-channel image signal recorded on said image recording medium with the opening and closing operations of the corresponding electro-optic switches, and rearranges said low frequency image signals into a single train of higher frequency image signals for projection onto said holographic screen.

6. The three-dimensional image display apparatus according to claim 1, wherein said display device is one of a liquid crystal panel and a cathode ray tube (CRT).

7. The three-dimensional image display apparatus according to claim 1, wherein said display device comprises a color image display.

8. The three-dimensional image display apparatus according to claim 7, wherein said color image display comprises a first color image display with a wavelength bandwidth of a red color, a second color image display with a wavelength bandwidth of a green color, and a third color image display with a wavelength bandwidth of a blue color.

9. The three-dimensional image display apparatus according to claim 1, wherein said display device displays images from respective channels of the multi-channel image signal for a predetermined time period, and each of said electro-optic switches is opened only when the images from the corresponding channel is displayed but closed otherwise.

10. The three-dimensional image display apparatus according to claim 1, wherein said switching mechanism comprises liquid crystal.

11. The three-dimensional image display apparatus according to claim 1, wherein said switching mechanism is opened and closed 60 times per second.

12. The three-dimensional image display apparatus according to claim 1, wherein said shutters are formed such that the width at the center is narrower than the width at the circumference so that they uniformly coincide with the area of said projection lens.

13. The three-dimensional image display apparatus according to claim 1, wherein said holographic screen is a reflection-type holographic screen configured to reflect the image signals projected thereon to a number of predetermined directions.

14. The three-dimensional image display apparatus according to claim 1, wherein said holographic screen is a transmission-type holographic screen configured to transmit the image signals projected thereon to a number of predetermined directions.

15. The three-dimensional image display apparatus according to claim 14, wherein the angle defined at the intersection of a first line and a second line is adjusted in the range of 30 to 45 degrees, said first line extending from the center of said projection lens to and beyond the center of said holographic screen, and said second line extending from the center of the view zone to and beyond the center of said holographic screen.

16. The three-dimensional image display apparatus according to claim 14, wherein the spectral characteristics of said display device have a narrow bandwidth for forming high resolution image by the transmission type holographic screen.

17. The three-dimensional image display apparatus according to any one of claims 1, 2 and 13, wherein the spectral characteristics of said image display device is such that the bandwidth coincides with a reflection wavelength range given by the selective spectral characteristics of said holographic screen.

18. The three-dimensional image display apparatus according to claim 1, wherein said switches define a plurality of sub-view zones in each view zone and the width of a respective sub-view zone is not more than a distance between the observer's two eyes and not less than the pupil size of a human eye.

19. A three-dimensional image display apparatus, comprising:

a display device configured to display an image corresponding to a signal from a selected channel of a multi-channel image signal;

a projection lens configured to project said image displayed on said display device, a switching mechanism comprising a plurality of electro-optic switches, being opened or closed one at a time for transmitting or blocking the projected image which passed through said projection lens; and a holographic screen configured to reflect the transmitted projected image to be viewed as a three-dimensional image, wherein said plurality of electro-optic switches are disposed adjacent to one another, and each of said switches is opened or closed in synchronization with the image signal in a corresponding channel of said multi-channel image signal.

* * * * *